Oct. 22, 1940.  J. J. ZEUGNER  2,219,146
TRANSPARENT CONTAINER CLOSURE
Original Filed Dec. 7, 1938
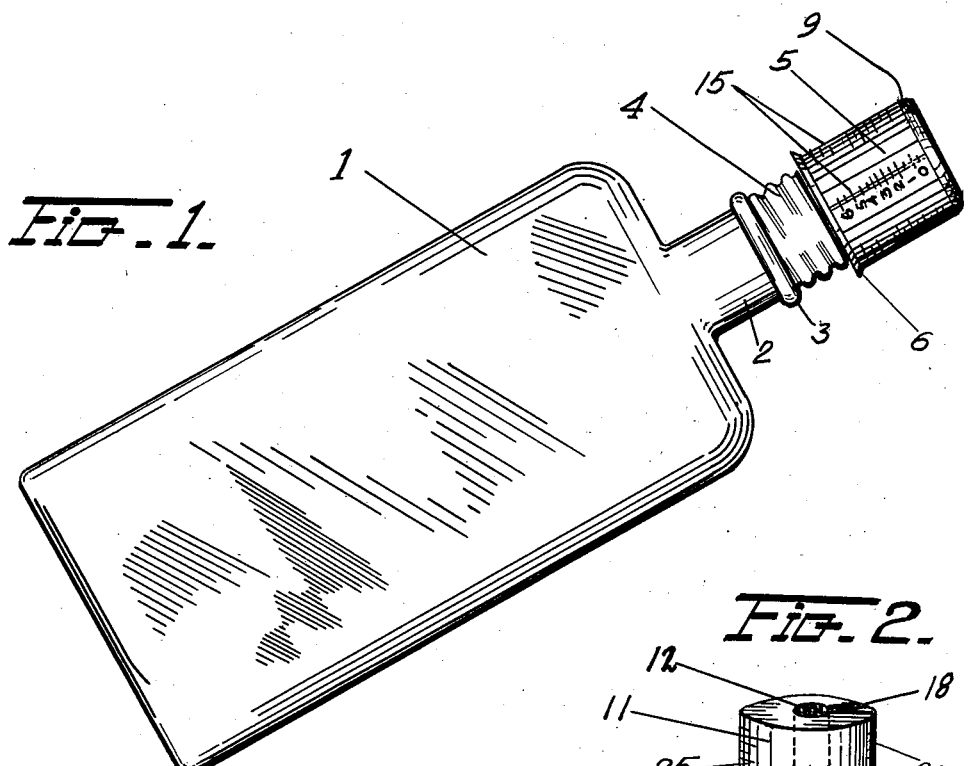
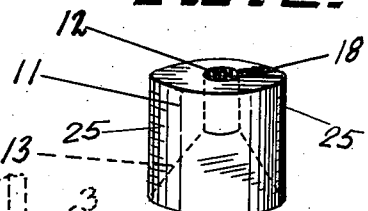
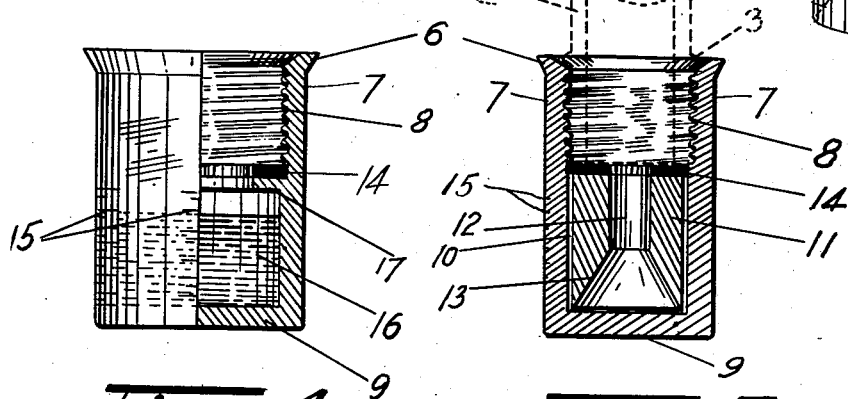
Inventor
JOHN J. ZEUGNER
By Howard J. Whelan.
Attorney Patented Oct. 22, 1940

2,219,146

UNITED STATES PATENT OFFICE 2,219,146

TRANSPARENT CONTAINER CLOSURE

John J. Zeugner, Baltimore, Md.

Application December 7, 1938, Serial No. 244,454
Renewed April 15, 1940

3 Claims. (Cl. 221—147)

This invention refers to bottles and more particularly to the caps or covers of same. It has among its objects to provide a cap that will provide accurate and visual measuring for its contents. Another object is to have the cap arranged for the insertion and removal of a dispensing cup for cleaning and inspection purposes. A further object is to have it arranged for accurately guaging the amount of liquid therein, from the exterior, or to some extent from inspection of its interior. Other objects will become apparent as the invention is more fully set forth.

In general, this device is to provide for a sanitary transparent measuring spoon cap or vial intended for sanitary measure and dispensers to eliminate the use of tea spoons and other measuring devices from which liquids are taken, as these measuring devices are unsanitary for use in hospitals, bathrooms, hotels, etc. All present measuring devices will measure only certain sizes because it is not possible to see how much is poured into the container, but in this patent it is possible to measure any required amount because of the transparent cap.

The conventional cap for bottles does not anticipate more than the closure of the same. In this invention, the caps of bottles particularly intended for medicines are specially designed and constructed to meet the details of the needs of the liquids to be dispensed, as well as their amounts. This construction provides for a cap to exteriorly mount on the bottle, and an extension to that portion adapted for taking a definite measured volume of contents. The upper portion of the extension is partitioned over to keep the contents from spilling.

In addition, the material of the cap is preferably transparent, and provided with marks that show the capacity in the cup. The markings are continued in several columns around the cap so that the liquid may be levelled accurately. This also enables the readings to be made from any horizontal point of view, and note if the liquid is positioned properly. The open end of the cap is made with an exterior rim bevelled sharply downwards to the exterior surface of the cap. The cap is placed on the bottle in a conventional manner and does not infringe on the interior contents by extending into same.

In the drawing, which illustrates an embodiment of this invention:

Figure 1 is a side view of a bottle with a cap for same embodying the invention;

Figure 2 is a detail of an insertion member in perspective,

Figure 3 is a longitudinal sectional view through the cap indicated in Figure 1, Figure 4 is a sectional detail of a modified form of cap.

Similar reference characters refer to similar parts throughout the drawing.

In the drawing a conventional screw-top glass bottle 1 suitable for medicines and like liquids is indicated, with its cap 5 removed and spaced therefrom. The bottle has a neck 2 with a screw section 4 and a neck ring 3 thereon to limit the position of the cap thereon.

The cap has its walls 7 of suitable thickness and is preferably of transparent material, that the contents within same may be observed therethrough. This cap is divided into two portions, a lower portion having screw-threads 8 adapted to fit externally on the bottle neck screw-section 4; and a so-called upper portion 10 both of which form a cup to take the quantities of liquid to be dispensed from the bottle and measured in this cup. The top 9 of the upper section forms the closure for the bottle and the support for the liquid to be dispensed and measured. The lower section has an exterior peripheral extension ring 6 suitably bevelled as shown for the purpose of cutting the liquids poured from the cap, in a quick and effective manner. This ring portion may come against the ring 3 on the bottle neck and provide an additional tight closure for the bottle and a blending of the exterior lines into one another.

In the construction and use of the cap, suitable markings 15 are made on the exterior surface around the same, so the readings can be made from various sides of the cap without difficulty. This cap is provided with an internal member 11 having a perpendicular passage 12 in it connected with a tapered, conical or frusto-conical portion 13 as indicated in Figures 2 and 3. This element fits in the cap loosely and permits the member 11 to set in same and at the same time allow liquid 16 in the cap surround it and appear to the view of the observer looking at any portion of the cap. The cork or gasket 14 keeps the member in place, and assists in sealing the bottle. It is marked similarly at 25 to the marks 15 which register with each other. The member 11 is preferably made as indicated to facilitate its manufacture and use in the cap as well as assure it being adaptable to any conditions anticipated or arising in general practice. The accuracy of the item can be definitely assured, regardless of any molding difficulties that might arise if not made in this manner for the cap. It also insures the possibility of cleaning or sterilizing this part, as it can be handled readily and conveniently when removed from the cap for the purpose.

In the use of the device, the cap 5 is removed from the bottle, inverted and allowed to receive the liquid 16 poured from the bottle 1 into it. The liquid is poured in the cap until it reaches the desired level as indicated by the selected markings 15 and 25. These markings may be for spoonfuls, cubic centimeters, or whatever is selected. The user knows definitely what he receives and can use the liquid in accurate amounts directly from the cap instead of using a spoon, etc. The continuous markings around the cap enable the observer to check up the level of the liquid, and avoid a wrong reading. The measuring member, with its markings 25 provides a further check up and accentuates the reading of the amounts in the cup of the cap. The measuring member is also provided with a slot 18 that allows the member to resiliently extend itself and yet not bind it to the interior of the cup. This slot enables the liquid to pass freely from inside the member to the exterior space about the same, and thus enable the liquid to maintain a proper level in and out of it.

The removal of the cork or gasket 14 at any time permits access to the interior of the cup and removal of the member. This enables the inside to be cleaned thoroughly and any sediment there to be removed. The outside markings can thus be registered accurately with the contents.

In the modified form indicated in Figure 4, the cap is divided into two compartments, with an intergral partition in between, all being of transparent material. The markings are similar to those in the original form. This form enables the cap to be made in one piece where such is preferred. When the caps are placed on the bottles after use, they form an air chamber above the bottle and allow same to be filled to the top. The cork 14 provides a resilient gasket for the closure of the cap on the bottle.

While but two forms of the invention are shown in the drawings, it is not desired to limit this application for patent to these particular constructions, other than limited by the prior art as it is appreciated that other forms could be used that would employ the same principles and come within the scope of the appended claims.

Having thus described the invention, what is claimed is:

1. In a cap of the class described a measuring member formed to loosely fit in the cap and having markings thereon for measuring liquids therewith in the cap, said member being slotted to allow it to extend itself and to permit facile movement of the liquid from the inside of the member to the exterior space about the same, and means for positioning the member in the cap.

2. A transparent cap of the class described arranged for attachment to a bottle, having a hollow structure and means within the structure for dividing the structure into an upper and lower portion, and permitting the upper portion to be utilized for measuring liquids observable through the transparent cap, said means having a side opening with interconnecting cylindrical and frusto-conical passages therein connecting each other and adapted to permit liquids measured thereby to pass freely in and around the means.

3. A transparent cap of the class described arranged for attachment to a bottle, having a hollow structure and means within the structure for dividing the structure into an upper and lower portion, and permitting the upper portion to be utilized for measuring liquids observable through the transparent cap, said means having a side opening with interconnecting cylindrical and frusto-conical passages therein connecting each other and adapted to permit liquids measured thereby to pass freely in and around the means, and graduating arrangements on the cap and means for indicating the level and amount of liquid in the cap visually.

JOHN J. ZEUGNER.